US012711423B2

(12) United States Patent
Doan Huu

(10) Patent No.: US 12,711,423 B2
(45) Date of Patent: Aug. 18, 2026

(54) TIME SERIES PREDICTION EXECUTION BASED ON DEVIATION RISK EVALUATION

(71) Applicant: SAP SE, Walldorf (DE)

(72) Inventor: Jacques Doan Huu, Guyancourt (FR)

(73) Assignee: SAP SE, Walldorf (DE)

(*) Notice: Subject to any disclaimer, the term of this patent is extended or adjusted under 35 U.S.C. 154(b) by 915 days.

(21) Appl. No.: 18/083,048

(22) Filed: Dec. 16, 2022

(65) Prior Publication Data

US 2024/0202579 A1 Jun. 20, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 9,870,417 | B2 | 1/2018 | Saurel et al. | |
| 10,305,967 | B2 | 5/2019 | Huu et al. | |
| 10,789,547 | B2 | 9/2020 | McShane et al. | |
| 11,494,699 | B2 | 11/2022 | Huu | |
| 2017/0071549 | A1* | 3/2017 | Seely | A61B 5/7275 |
| 2018/0357360 | A1* | 12/2018 | Braun | C12Q 1/6876 |
| 2019/0286541 | A1* | 9/2019 | Sobala | G06F 11/3447 |
| 2020/0151588 | A1 | 5/2020 | Huu | |
| 2020/0175402 | A1 | 6/2020 | Cameron et al. | |
| 2021/0334667 | A1 | 10/2021 | Huu | |
| 2022/0043784 | A1 | 2/2022 | Huu | |
| 2022/0253856 | A1* | 8/2022 | Wong | G06Q 20/4016 |
| 2023/0108808 | A1* | 4/2023 | Lerman | G06N 5/01 717/104 |
| 2023/0132337 | A1* | 4/2023 | Tiwari | G06F 8/34 717/101 |

(Continued)

OTHER PUBLICATIONS

NPL Arlot A survey of cross validation procedures for model selection 2009.*

(Continued)

*Primary Examiner* — Paul M Knight
(74) *Attorney, Agent, or Firm* — Fish & Richardson P.C.

(57) ABSTRACT

The present disclosure relates to computer-implemented methods, software, and systems for identifying data patterns based on data observations collected as time series data. A cross-validation assessment of a plurality of predictive models is performed. Based on the cross-validation assessment, a respective deviation risk is determined. The respective deviation risk is determined based on comparing forecasting variability distribution for a validation data set during the cross-validation assessment with forecasting variability distribution for test values from a test data set. The test data set represents forecasted values generated based on a respective predictive model for a future horizon. A predictive model can be excluded based on evaluating deviation risks of each of the predictive models. A model selection of a candidate model from the set of candidate predictive models is performed. The candidate model is selected based on evaluation of accuracy of the set of candidate predictive model according to the cross-validation assessment.

20 Claims, 6 Drawing Sheets

(56) References Cited

U.S. PATENT DOCUMENTS

2023/0401607 A1* 12/2023 Rastogi .............. G06Q 30/0276

OTHER PUBLICATIONS

NPL Bergmeir On the use of cross validation for time series 2012.*
NPL Brownlee How To Backtest Machine Learning Models for TSF 2019.*
NPL Brownlee2 What is the Difference Between Test and Validation Datasets 2020.*
NPL Buerkner Approximate leave future out cross validation 2020.*
NPL Cerqueira Evaluating time series forecasting models 2020.*
NPL Funk Individual inconsistency and aggregate rationality 2020.*
NPL Grey Stock Prediction with ML Walk forward Modeling 2019.*
NPL Grootendorst Validating your Machine Learning Model 2019.*
NPL Schnaubelt A comparison of machine learning model validation 2020.*
Analyticsindiamag.com [online], “How to improve time series forecasting accuracy with cross-validation?” May 2022, retrieved on Dec. 16, 2022, retrieved from URL <https://analyticsindiamag.com/how-to-improve-time-series-forecasting-accuracy-with-cross-validation/>, 30 pages.
Medium.com [online], “Cross Validation in Time Series” Jan. 2020, retrieved on Dec. 16, 2022, retrieved from URL <https://medium.com/@soumyachess1496/cross-validation-in-time-series-566ae4981ce4#:~:text=Cross%20Validation%20on%20Time%20Series,for%20the%20forecasted%20data%20points>, 14 pages.
Timescale.com [online], “What Is Time-Series Forecasting?” Sep. 2022, retrieved on Dec. 16, 2022, retrieved from URL <https://www.timescale.com/blog/what-is-time-series-forecasting/#:~:text=In%20the%20simplest%20terms%2C%20time,specific%20point%20in%20the%20future.>, 17 pages.

* cited by examiner

600
Processor
610
Memory
620
Storage Device
630
Input/Output
Input/Output Devices
640
650

TIME SERIES PREDICTION EXECUTION BASED ON DEVIATION RISK EVALUATION

TECHNICAL FIELD

The present disclosure relates to computer-implemented methods, software, and systems for data processing.

BACKGROUND

Customers' needs are transforming and imposing higher requirements for process execution, lifecycle management, and technical landscape that also support high availability to access software resources provided by an underlying software platform.

Software applications, systems, devices, and processes, among other examples, can be associated with data monitoring and prediction of execution results, process outcome, and/or performance. Data observations from various sources can be observed to generate predictive models that can be used in the context of data simulation and automation.

SUMMARY

Implementations of the present disclosure are generally directed to a computer-implemented method for performing a selection of a predictive model from a set of candidate predictive models based on evaluation of deviation risk.

In some implementations, an example method can include operations such as: performing a cross-validation assessment of a plurality of predictive models, wherein the cross-validation assessment is based on time series data that is divided into an estimation data set and a validation data set, and wherein the estimation data set is used as training data; based on the cross-validation assessment, determining, for each predictive model, a respective deviation risk, wherein the respective deviation risk is determined based on comparing forecasting variability distribution for the validation data set during the cross-validation assessment with forecasting variability distribution for test values from a test data set, wherein the test data set represents forecasted values generated based on a respective predictive model for a future horizon; excluding one or more predictive models of the plurality of predictive models to define a set of candidate predictive models, wherein the excluding is based on evaluating deviation risks of each of the predictive models of the plurality of predictive models; performing a model selection of a candidate model from the set of candidate predictive models, wherein the candidate model is selected based on evaluation of accuracy of the set of candidate predictive model according to the cross-validation assessment; and providing the candidate model for execution of a prediction for a requested time horizon.

In some instances, the method can include obtaining the time series data, which comprises data observations associated with a date as a time dimension; and generating the plurality of predictive models for predicting a measure variable determined from the data observations.

In some instances, the plurality of predictive models can include one or more of a double exponential smoothing model, an auto regression model, a linear regression model, and an exponential smoothing model.

In some instances, the method can include executing the candidate model to provide an output including predicted values for the requested time horizon. In some instances, the output can be provided for use in automation of a service process execution.

In some instances, the comparing of the forecasting variability distribution is performed based on a deviation rejection rule for excluding predictive models that experience deviation in the forecasting variability distribution above a threshold.

In some instances, the cross-validation assessment is performed over a plurality of definitions of an estimation data set and a validation set based on respective different cut-off points to divide the time series data at different subsequent time points.

In some instances, the determining of a first deviation risk for a first predictive model from the plurality of predictive models can include: generating a first test data set for a future test time horizon, the first test data set being generated based on the first predictive model. The first predictive model can be trained based on a first set of estimation data sets of the time series data, and the first predictive model is validated based on a first set of validation data sets of the time series data, wherein each set of the first set of estimation data sets map to a respective set of the first set of validation data sets and to a cut-off point for the time series data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The subject matter described in this specification can be implemented to realize one or more of the following advantages. Time series forecasting where a best model is selected among candidates by reducing the risk to select models that would not capture deviations in last values of the training set can improve the application of the forecasting in system processes and production set-ups. The exclusion of models that do not capture late changes observed in time series can be performed in an optimized and robust manner. Based on such exclusion, the model selection performed with cross validation output models that are more stable and accurate to execute prediction services and utilize those results in particular technical context, for example, to automate processes execution, to automate configurations and operation regimes, or to monitor system performance, among other example technical implementations.

The details of one or more implementations of the present disclosure are set forth in the accompanying drawings and the description below. Other features and advantages of the present disclosure will be apparent from the description, drawings, and the claims.

BRIEF DESCRIPTION OF DRAWINGS

Like reference numbers and designations in the various drawings indicate like elements.

DETAILED DESCRIPTION

Figure 1:
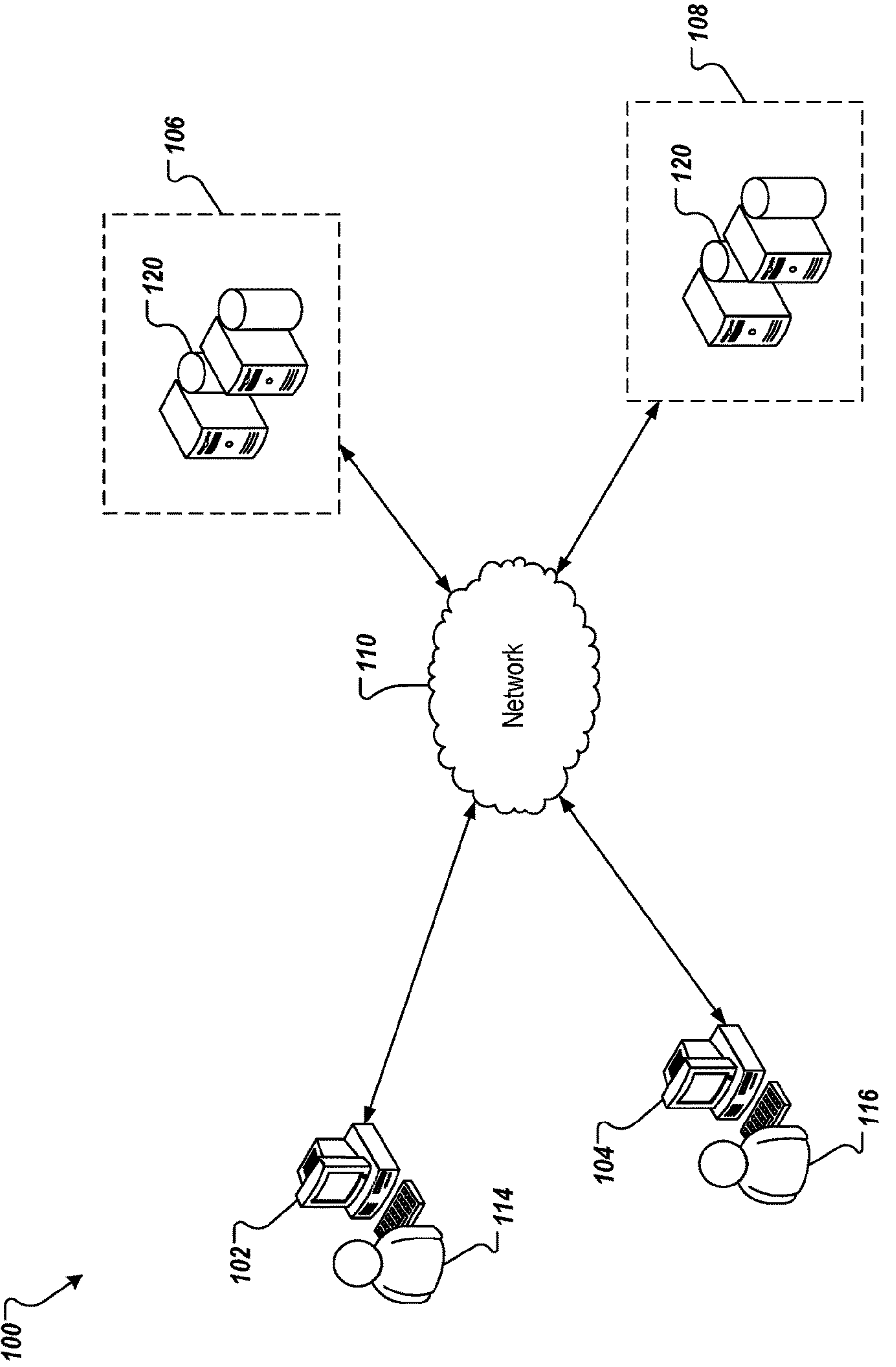
FIG. 1 is a block diagram depicting an example computer-implemented system that can execute implementations of the present disclosure in accordance with implementations of the present disclosure.

The present disclosure describes various tools and techniques for identifying data patterns based on data observations collected as time series data. The identification of data patterns can be based on predictive models that can be validated to select a model that accurately reflects the underlying specifics of the time series data. In some instances, time series data may include outlier values as part of the latest collected observations. The time series data can be used (as a whole or in part) as training data to train a model that provides accurate prediction results that take into consideration unexpected events resulting from late outlier values in the time series data.

In some instances, the result from determining a predictive model (for example, determined at a predictive service implemented in a cloud or on-premise platform) can be used for automating process executions, planning and forecasting executions, performing system maintenance based on predicted resource demand and/or supply, adjustments to sensors and devices in physical spaces, or defining device work schedules, among other example of utilization.

In some instances, time series analysis can be used in the context of various forecasting tasks and processes defined in organizations, for example, forecasting production units, sales, and estimating prices, among other example organizational processes. Further, forecasting can be used in the context of automating process execution based on accurate prediction of process execution results, scheduling of operations of devices, systems and environments, or other performance prediction executions.

In some instances, predictive technology can be combined with planning activities to support planning users in generating useful predictions that can be implemented in different contexts or environments. Time series analysis technologies and methods support the analysis of data pointers (measure data) that is associated with a time/date aspect. A predictive model can be derived based on such time series including dates and measures.

In some instances, prediction methods such as regressions, correlation, or neural network implementations, among other example methods can be used to derive indicators that can be identified as contributors in the forecasting model.

In some instances, an organization can rely on planning software and/or a planning system (for example, on-premise or cloud applications and systems) to perform forecasting and implemented predicted results into implemented organizational processes (for example, business processes, resource scheduling, activities, and execution automation). While the disclosure is described with respect to a planning calendar, business calendar, process, resource scheduling, activities, and automated executions, the described concept has applicability in other technological areas/operations using time series data, such as in the context of manufacturing machine operation, construction work process planning, freight processing of goods, cloud service provisioning, system infrastructure instantiation and maintenance, and upgrade process triggering.

FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a cloud environment 106, and a cloud environment 108. The cloud environment 106 may include one or more server devices and databases (for example, processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, a public switched telephone network (PSTN)), or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the cloud environment 106 can host applications and databases running on the host infrastructure. In some instances, the cloud environment 106 can include multiple cluster nodes that can represent physical or virtual machines that can represent web node clusters. A hosted application and/or service can run on VMs hosted on cloud infrastructure.

In some instances, the cloud environment 106 and/or the cloud environment 108 can provide infrastructure for generating, evaluating, and executing a predictive model to predict values for a variable associated with data observation as further described in relation to FIGS. 2, 3, 4, and 5.

In some instances, the cloud environment 106 and/or the cloud environment 108 can provide infrastructure to perform time series forecasting (TSF), where TSF results can be utilized in different contexts and scenarios implemented by applications and systems, such as in business application landscape like Enterprise Resource Planning (ERP) system. In some instances, accurately forecasting future values of key metrics can be used to optimize process executions and/or align with processes such as supply chain operations, recruiting, hardware resource planning, and device maintenance, among other example operations.

In the field of machine learning, generating predictive models that provide accurate future predicted (forecasting) values is of high importance and therefore, generated models based on different techniques can be evaluated to perform model selection that supports improved accuracy in prediction as well as efficiency in the prediction generation.

In some instances, TSF, which is performed based on a given predictive model, can exhibit unexpected inefficiency when abrupt changes on the signal values arise lately within the time series that is used for the model generation. For example, abrupt changes in the data trends can be noticeable only at a very last period of time associated with a substantially small percentage of observations within the time series data (for example, within the last 10% of observations, or within a threshold number of observations in the time series data). In some instances, this may cause in certain conditions high and unexpected forecasting deviation on the future period. Such sudden variations over time, which are observed only on a portion of data points of the time series data (that is, at the end of the time horizon corresponding to validation data from the time series data) can be common in real world, typically during unstable time periods where worldwide events or national crises appear (for example, pandemics (such as COVID), war (such as, the war in Ukraine), or other unforeseen events with significant impact on the data observations). For example, worldwide events can have an impact on geopolitical situations and financial stability that can reflect processes such as system demand (for example, execution of more online services), changes in transactions with goods (for example, an increase in inflation rate can affect supply chain and transaction execution), production, or other processes.

In accordance with the present invention, a model can be selected from multiple available candidate models, where the selection can be performed to mitigate the model selection's incorrectness by identifying and excluding candidate models associated with high risk (for example, above a threshold risk value) that forecasting values for a future horizon may significantly deviate from the ones observed during assessment of the candidate model on the validation set. In such way, the variability of the forecasting values for a future horizon can be verified to determine whether the variability deviates significantly (within a threshold range or deviation) from forecasting variability distribution estimated from a cross-validation process. In some instances, cross-validation process and techniques enable generation of a set of n data arrays including different estimation-to-validation data splits. For each split, the model can be trained based on an estimation portion and h values (that is, forecasting values) can be predicted for use in validation (for example, "h" is defined based on a requested prediction horizon). Based on the generated forecasting values, an estimation can be made for the statistical distribution of the variabilities of the forecasting value (for example, range or standard deviation). Based on obtaining h forecasting values for a future horizon (test data), a variability metric can be computed and compared with the variability distribution obtained from the cross-validation process (for example, range or standard deviation).

For example, the variability of the forecasting values (for example, 100 for values in a range between 0 to 100) is an outlier for the ranges obtained from the cross-validation process (for example, 4, 7, 12, 7, 40, 32, 18, and 24), if the variability value is far from the range population in the validation set.

This verification of the deviation of the forecasting values with portions of the time series data can be used as a condition for filtering multiple candidate models to identify a set of the models that can be evaluated to select a most accurate model. The most accurate model can be selected based on a defined criteria for selection of a model based on comparing accuracy of models. The selection can be performed based on models that are pre-filtered to exclude "outlier" models that deviate, thus to provide prediction results that do not deviate significantly from observations within a particular time period or portion of observations, such as the latest portion of the time series data.

In some instances, a deviation risk exclusion rule can be implemented to filter available candidate models to select only a subset of models that represent forecasting variability distribution in the time series data that adequately addresses the data observations (that is, including abrupt deviations at the end of the time series data). Such filtering based on a deviation risk exclusion rule can be provided to complement a standard model evaluation and selection criteria to provide a model for prediction execution.

Figure 2:
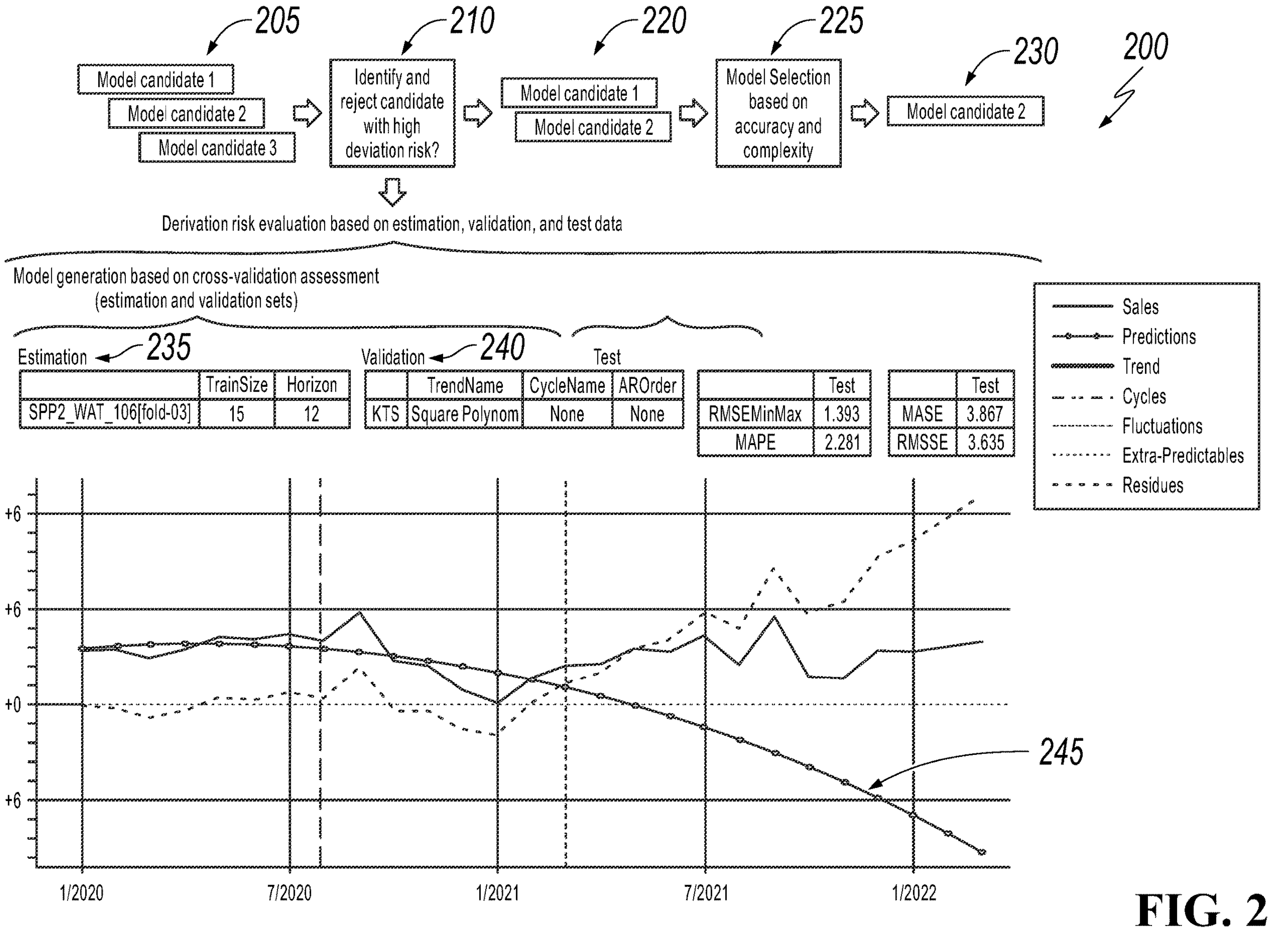
FIG. 2 is a block diagram depicting an example flow of selecting a predictive model based on evaluation of candidate predictive models based on a cross-validation assessment with considerations for reducing deviation risk in accordance with implementations of the present disclosure.

FIG. 2 is a block diagram depicting an example flow 200 of selecting a predictive model based on evaluation of candidate predictive models based on a cross-validation assessment with considerations for reducing deviation risk in accordance with implementations of the present disclosure.

In some instances, different modeling technique can be used to generate predictive models 205 as candidate models for a model selection. Model selection is very common approach in the machine learning space since one model may not be accurate in all classes of problem, and thus several options can be considered to identify a model that represents the class in the most accurate way.

At 210, the candidate models 205 can be evaluated to identify and reject a candidate model(s) that is with a high deviation risk for providing predictions that are deviating significantly (for example, based on a deviation threshold) from data observations considered during validation steps.

In some instances, time series data can be split into two sets—estimation data set and validation data set. For example, time series data can be plotted on a diagram where a first portion of the data is presented as part of the estimation 235 section, and the second portion of the data is presented as part of the validation 240 section. Based on such splitting or dividing of the time series data, the estimation data set is used for training a predictive model, and a selection of a model out of the multiple candidate models

205 can be selected by validating accuracy of the predictive models 205 based on the validation data set (for example, validation portion 240).

In some instances, the validation portion of the time series data can be used to determine whether a model fits the validation data to be able to determine the accuracy of the model to predict future observations. If the model is generated based on a first portion of the data, and the validation is performed based on a second, subsequent portion of the data, it may be possible that the model does not take into account specifics in the data observations that are observed at the validation data set portion (that is, as a later portion of the time series data used for the generation of the predictive model).

Figure 3:
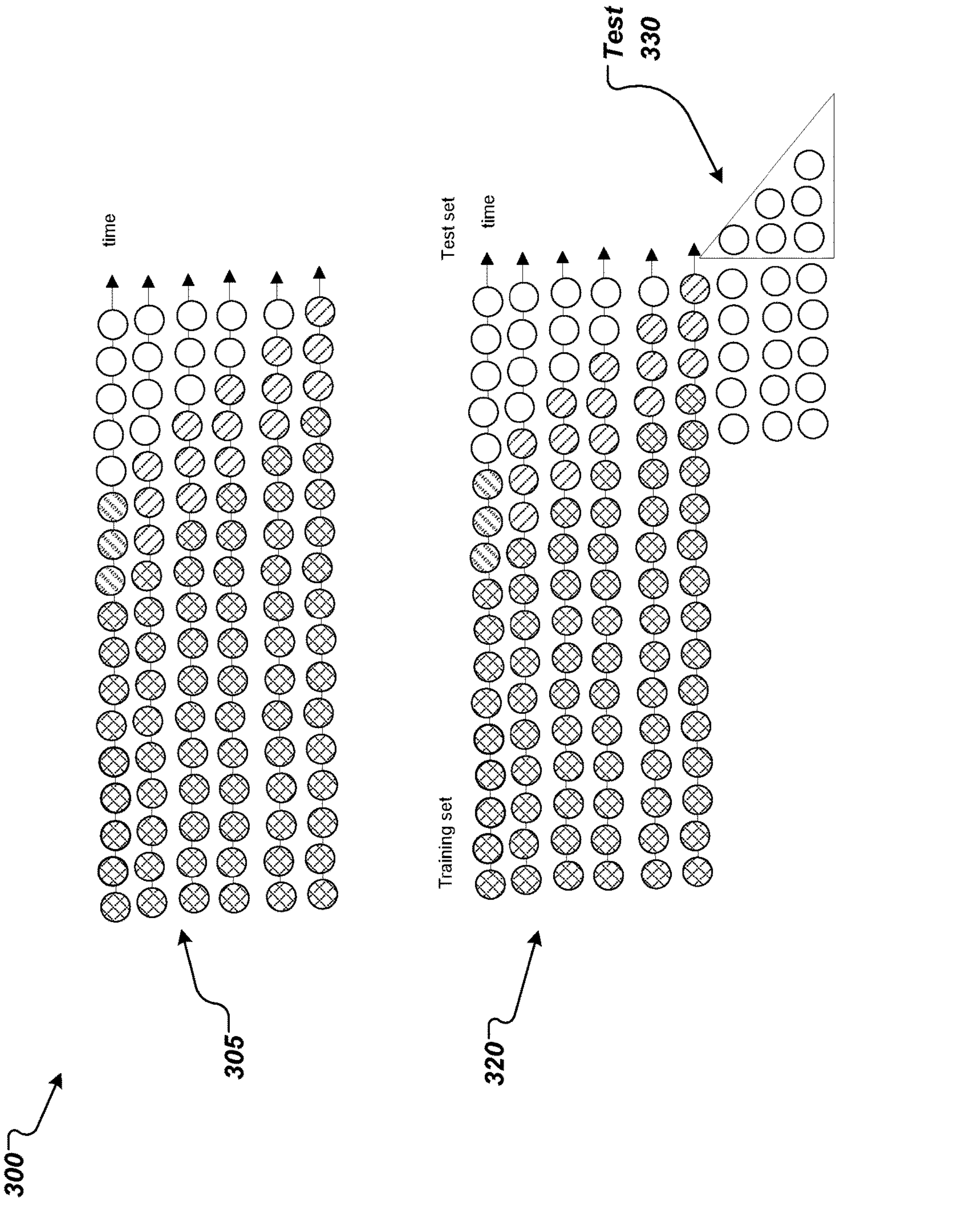
FIG. 3 is a block diagram presenting examples of processes for executing cross-validation assessment of predictive models in accordance with implementations of the present disclosure.

In some instances, the time series data can be used in the context of cross-validation techniques, where the time series data can be split multiple times into an estimation and validation data sets, as described in FIG. 3.

In some instances, predictive models generated for forecasting measures associated with a time series data can be evaluated based on considerations of the accuracy of the models based on a cross-validation assessment as well as on considerations of deviation of the model from forecasting variability distribution observed throughout the whole scope of observations.

In some instances, at 210, the candidate models 205 can be evaluated based on comparing forecasting values variability distribution during the cross-validation assessment with forecasting values variability from a test data set (for example, that is test data 330 of FIG. 3 that is a future horizon): a variability metric can be either a value range or a standard deviation from the mean. The candidate models 205 can be evaluated separately, where test data sets can be generated based on each of the models.

In some instances, the test data set can be data generated as forecasted values generated based on a respective predictive model for a future horizon, for example, for a horizon where it can be expected to observe abrupt changes. For example, test 245 data can be test data used to compare with validation 240 data. The test 245 is plotted as a continuation of the plotted estimation and validation data. If the particular model was applied, the test 245 data would be the expected future data (prediction based), however, such if test data variability is deviating from the forecasting values variability distribution in the cross-validation 240 portion based on a determination according to deviation criteria, the model may be rejected or filtered from the original set of candidate models 205. In some instances, the variabilities of the forecasting values can follow a normal (Gaussian) distribution on the validation set. If the variability of the forecasting values on a future period (test period) is (for example, the standard deviation of the forecasting values) is three times further way from the mean of the distribution of the validation set, the forecasting variability can be qualified as an outlier (for example, abnormal with regards to the variabilities observed during the cross-validation process).

At 220, a subset of the candidate models 205 are determined, where the subset is defined based on filtering of candidates that are associated with deviation risks (as determined at 210) that is above a threshold and can be considered to experience high deviation risk.

Figure 4:
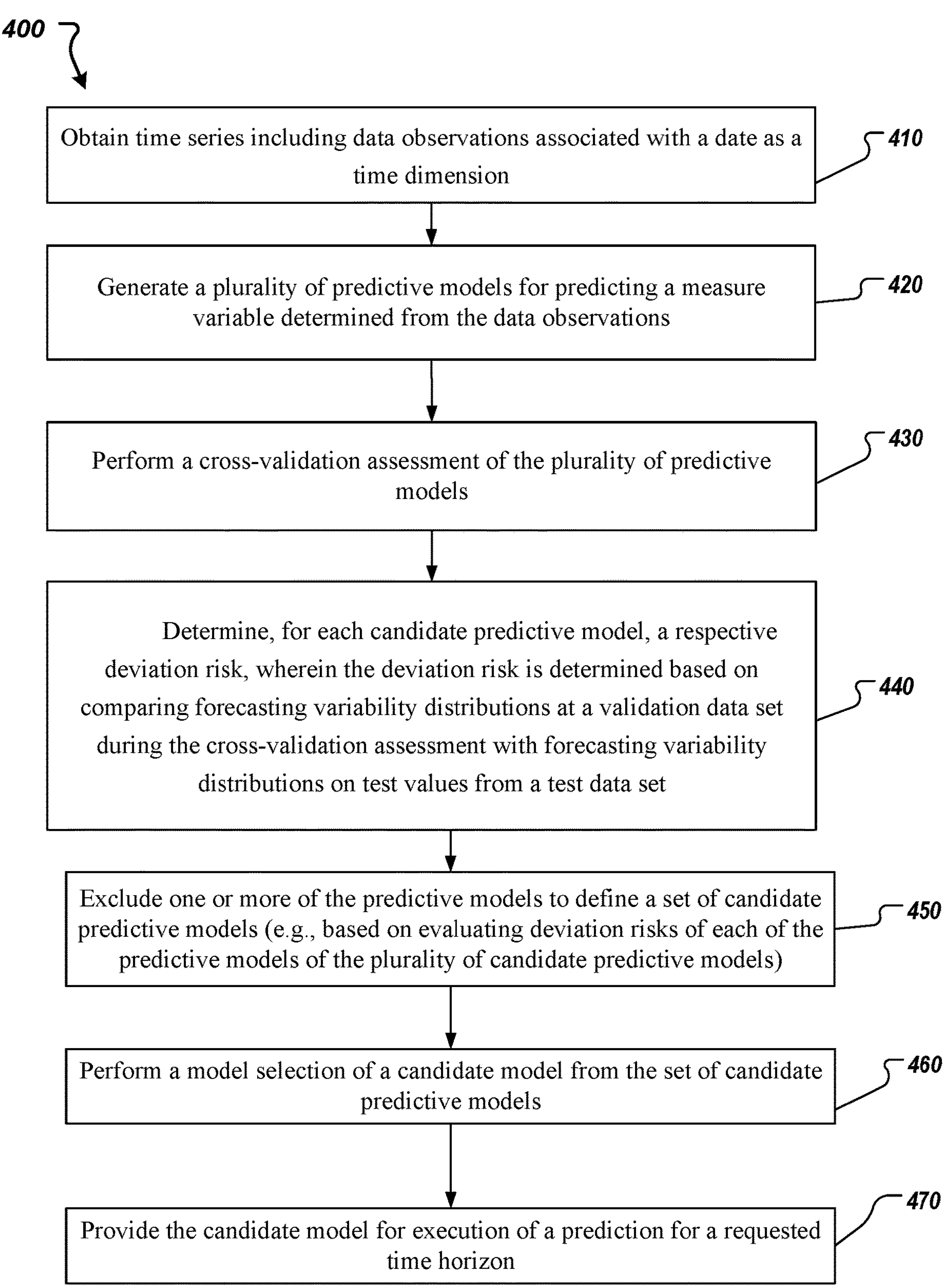
FIG. 4 is an example of a process for selecting a predictive model from a set of candidate predictive models based on deviation risk evaluation in accordance with implementations of the present disclosure.
Figure 5:
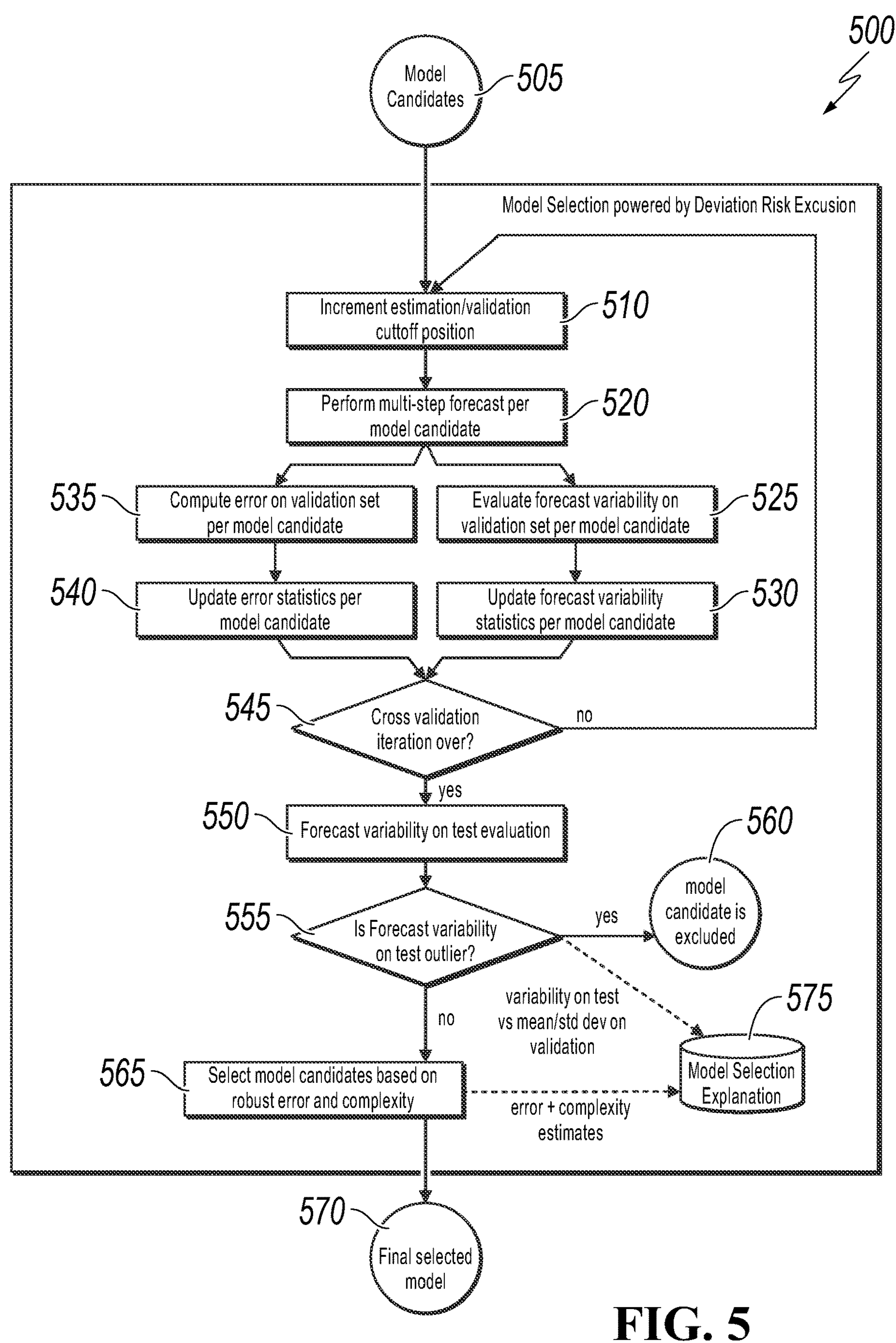
FIG. 5 is an example of a process for selecting a predictive model based on filtering candidate models based on deviation risk considerations in accordance with implementations of the present disclosure.

At 225, the subset of candidate models 220 is evaluated to perform a selection of a model from the subset that is based on evaluation of accuracy of the subset of candidate predictive model 220 according to the cross-validation assessment (for example, based on the time series data and cross-validation estimation as described in FIGS. 3, 4, and 5).

Based on the model selection, a candidate model 230 is selected. The selected model 230 can be considered a model that is selected based on taking into account the model complexity, specifics in the forecasting variability distribution of the training data, and accuracy of the model to predict future observations.

FIG. 3 is a block diagram presenting examples of processes for executing cross-validation assessment of predictive models in accordance with implementations of the present disclosure. In some instances, the cross-validation assessment can be performed in the context of selecting a predictive model based on evaluation of candidate predictive models based on a cross-validation assessment with considerations for reducing deviation risk as described throughout this disclosure and, for example, in relation to FIGS. 1, 2, 4, and 5.

In some instances, models are trained based on a portion of time series data that is designed as estimation data, for example, as discussed in relation to FIG. 2. The trained models can be validated according to cross-validation techniques based on validation data that is part of the time series data and also based on test data, as discussed throughout this disclosure.

In some instances, cross-validation can be performed to support model selection. The cross-validation can rely on a single or multiple splits of the time series data to ensure a more robust error measurement of errors of the estimations that are calculated during validation. In some instances, errors in the validation can vary on the way that estimation and validation data sets are defined, that is the definition of a cut-off point to divide the time series data.

At diagram 300, an example execution of multi-cross validation assessment is represented. The diagram 300 includes multiple lines, where each line includes bullet points that represent the data points of the time series data. For example, at line 305, a first portion (cross-checked bullets) of the time series data is designated as estimation set, and a second portion (that is, a subsequent portion marked with single-line crossing) of the time series data is designed as a validation set whose size is set to the horizon h.

Each row of the diagram represents each of the validation iterations, where each row has a particular division between estimation and validation data sets. Thus, each validation iteration is for a validation step, and the data is generated at each line with a different cut-off point moving ahead to the next data point.

As shown on diagram 300, the cross-checked bullets are data points from the time series data that are used for the training (learning phase). The validation horizon in this example is three (3), that is three data points of each validation iteration, where the horizon is moving (or shifting) at each validation iteration. For each row that corresponds to an iteration, a horizon-wide forecasting error can be determined based on determining a gap (or distance) between the forecasting values (the bullets marked with a single-line crossing) and their respective actual values (that is, the cross-checked bullet that is presented on the line below), as shown with arrows between bullet points between rows.

Based on the execution of a cross-validation assessment, a final assessment with a measure of an error of the estimation of a particular predictive model can be performed. The final error can be determined based on errors for all horizons (points 1, 2, and 3) and for all validation data points (marked with bullets with a single-line crossing). For example, the final error can be calculated as a mean value of the individual errors for each data point (shown as a bullet) in the horizon over each of the rows (validation estimations).

In some instances, cross-validation assessment can be performed for a set of predictive models for model selection to elect a model out of multiple predictive model that has demonstrated high accuracy, for example, based on a threshold scale for determining accuracy based on the computer error.

At diagram 320, the cross-validation diagram 305 is extended with further iterations, where these iterations include generation of a test set 330 as shown inside the triangle at the lower right side of the diagram. The test set 330 is generated for a number of iterations (or line in the diagram) that correspond to the validation horizon used (in the presented example, the horizon is three (3)). The test set 330 can be as described in FIG. 2 and can be generated based on the model associated with the particular (multi) cross-validation assessment.

In some instances, (multi) cross-validation can be performed based on validation data set and a test set. The model can be generated based on the training data set, the model can be validated based on the validation data set, and the test set can be used for performing a comparison of the forecasting variability observed at the test set and the ones from validation sets to determine whether there is a deviation (for example, based on deviation criteria).

In the diagram 320, the test data set is forecasting value on a future period where actual values are not known, so an actual error in the forecasting may be infeasible to provide. However, forecasting value may still be included in the evaluation to determine whether those forecasting values variability deviate abruptly and/or in high order of magnitude (for example, exceeding 3 times the standard deviation from the mean of the variability population issued from the cross validation). In some instances, cross-validation can be performed based on considering both validation and test data to provide a more precise model selection from a set of models that can be evaluated to determine a model that has high accuracy as well as provides an adequate representation of the forecasting variability distribution throughout the time series data used for the model selection. For example, sudden change on forecasting variance or deviation may arise very lately at last data points in the validation data set when the last data points on validation data set take unusual values (outliers, non-stationary series, or others unexpected deviation) which can lead to providing not accurate results from executing a prediction based on the trained model that did not take into consideration late deviations in the time series data.

FIG. 4 is an example of a process 400 for selecting a predictive model from a set of candidate predictive models based on deviation risk evaluation in accordance with implementations of the present disclosure.

At 410, time series data comprising data observations associated with a date as a time dimension are obtained. The time series can be data collected from sensor, from system logs, from process execution, or other data sources, as well as a combination thereof.

At 420, a plurality of predictive models is generated for predicting a measure variable associated with the data observations. The predictive models can be based on different predictive techniques. The predictive models can be generated based on machine learning techniques for training model based on training data and validating the models based on validation data, or regressions techniques, among other forecasting techniques. In some instances, the obtained time series data can be divided into training and validation data, as a single or multiple divisions, and used for cross-validation assessment of the models for their accuracy.

In some instances, the predictive models may provide inaccurate results if the models are not verified for outlier data that can be observed at a latest portion of the time series data, for example, data that is only used for validation, and/or data that even if validation is not evaluated for a validation error since there is no actual data for calculating validation errors for such data as explained in relation to FIG. 3.

At 430, a cross-validation assessment of a plurality of predictive models is performed. The cross-validation assessment is based on time series data. The time series data can be divided into an estimation data set and a validation data set. The estimation data set is used as training data. In some instances, the time series data can be divided at multiple cut-off points into validation and estimation data portions, as described in relation to FIG. 3.

At 440, based on the cross-validation assessment (as performed at 430), a respective deviation risk for each predictive model from the plurality is determined. In some instances, the deviation risk is determined based on comparing the forecasting values variabilities at the validation sets set during the cross-validation assessment with forecasting values variability from a test data set. In some instances, the test data set represents forecasted values generated based on the respective predictive model for a future horizon.

At 450, one or more of the predictive models are excluded to define a set of candidate predictive models. In some instances, the excluding is based on evaluating deviation risks of each of the predictive models of the plurality of predictive models. The evaluation can be performed based on a deviation rejection rule for excluding predictive models that experience deviation in the data forecasting variability distribution above a threshold.

At 460, a model selection of a candidate model from the set of candidate predictive models is performed. The candidate model can be selected based on an evaluation of accuracies of each model of the set of candidate predictive model according to the cross-validation assessment.

At 470, the candidate model is provided for execution of a prediction for a requested time horizon. In some instances, the candidate model can be to provide an output including predicted values for the requested time horizon. In some instances, the output can be provided for use in automation of a service process execution in accordance with described examples throughout this disclosure.

FIG. 5 is an example of a process 500 for selecting a predictive model based on filtering candidate models based on deviation risk considerations in accordance with implementations of the present disclosure.

In some instances, the process 500 can be performed based on a request to provide a predictive model for executing predictions related to a process or system, where a model selection is performed, and multiple models are generated based on obtained time series data associated with the process or system.

At 505, a plurality of candidate models is obtained. The candidate models can be generated based on various modeling techniques, and can be substantially similar to the discussed candidate models at FIGS. 1, 2, 3, and 4.

The candidate model can be generated based on training data part of the obtained time series data, as discussed throughout this disclosure.

At 510, each model is evaluated at each iteration, where for each model a set of cross-validation assessment is performed based on incremental dividing of the time series data into estimation and validation data based on multiple cut-off positions. For example, a data set as described at 320, FIG. 3 can be generated, where multiple iterations of the evaluation can be performed over differently defined sets of estimation and validation data based on a moving pointer that is the cut-off position.

At 520, a multi-step forecasting per candidate model is initiated. At 535, an error on a validation set per candidate model is calculated in iterations. The iterations can be performed based on the multiple divisions of the time series data as previously described. For example, the error can be calculated as described in relation to the description of 320 of FIG. 3 for each subsequent iteration. At 540, an error statistics per candidate model is determined and updated iteratively at each iteration. At 525, at each iteration, a forecasting variability is evaluated per candidate model.

In some instances, multi-step forecasting can be performed to provide prediction values for all horizons (defined for the validation set) for a given set of horizon data points (for example, from 1 to h (max horizon defined by a user)). For example, for a sale manager who needs to have the sale forecasts for next week in a daily basis, there are 7 forecasted values for each horizon (1 to 7). Multi-step forecasting variability can be measured per validation iteration. The variability can be measured based on descriptive statistics and metrics such as the range (min-max) of the observations, a standard deviation (dispersion around its mean), or a combination thereof.

In some instances, at 525, statistical characteristics of the variability of the forecast on the validation set can be calculated, and those statistics can be collected and updated per model at 530. For example, those statistics can be kept up to date at a storage or database related to the predictive model selection.

At 545, it is determined whether the validation is executed for all the iterations and respective divisions of estimation and validation sets. If it is determined at 545, that there are further validation steps (branch "no"), than the flow continues to perform the operations 510 to 545. The cycle between operations 510 to 545 is repeated iteratively. If the validation is performed for all the multiple divided sets as defined (for example, based on the defined validation horizon), at 550 (branch "yes"), forecasting variability of the model on the test data is determined (for example, as described in relation to FIGS. 1, 2, 3, and 4).

At 555, it is determined whether the variability of the forecast shows that the test values are significantly deviating from the validation data set. In some instances, the determination that a model shows forecast results that deviate from the validation (for example, called an outlier) can be determined based on a particular confidence level (for example, 95%) that can be used to determine which values in the validation data set are considered infrequent or abnormal to then determine whether the differences between the forecasting variability distribution at the validation data set and the test data set diverge above a particular divergence threshold.

If at 555 it is determined that the model is an outlier, that is, there is significant deviation between the test and validation data sets and the observed forecasting variability distribution, then the model is excluded at 560. Such evaluation is performed for each model that is processed at 500. If at 555 it is determined that the model is not an outlier, that is, there are no significant deviations between the test and validation data sets and the observed forecasting variability distribution, then the model is provided for selection at 565.

At 565, a set of models from the candidate models 505 are determined based on the filtering of the candidate models 505 to exclude the models that are identified as outliers at 560. The set of models that are selected at 565 can be provided, at 570, for example, for further evaluation and selection of a model to be used for executing predictive services.

In some instances, the models determined at 565 are selected based on evaluation of their error in forecasting and their robustness. In some instances, a model selection explanation 575 can be provided that includes information for the assessment of the models and the errors computed for these models. In some instances, the model selection explanation 575 can be automatically generated based on computations performed at process 500 and/or the computations at the process 500 can be provided to a user that can prepare an explanation for the models and their accuracy and store the models with metadata and explanations at 575.

Figure 6:
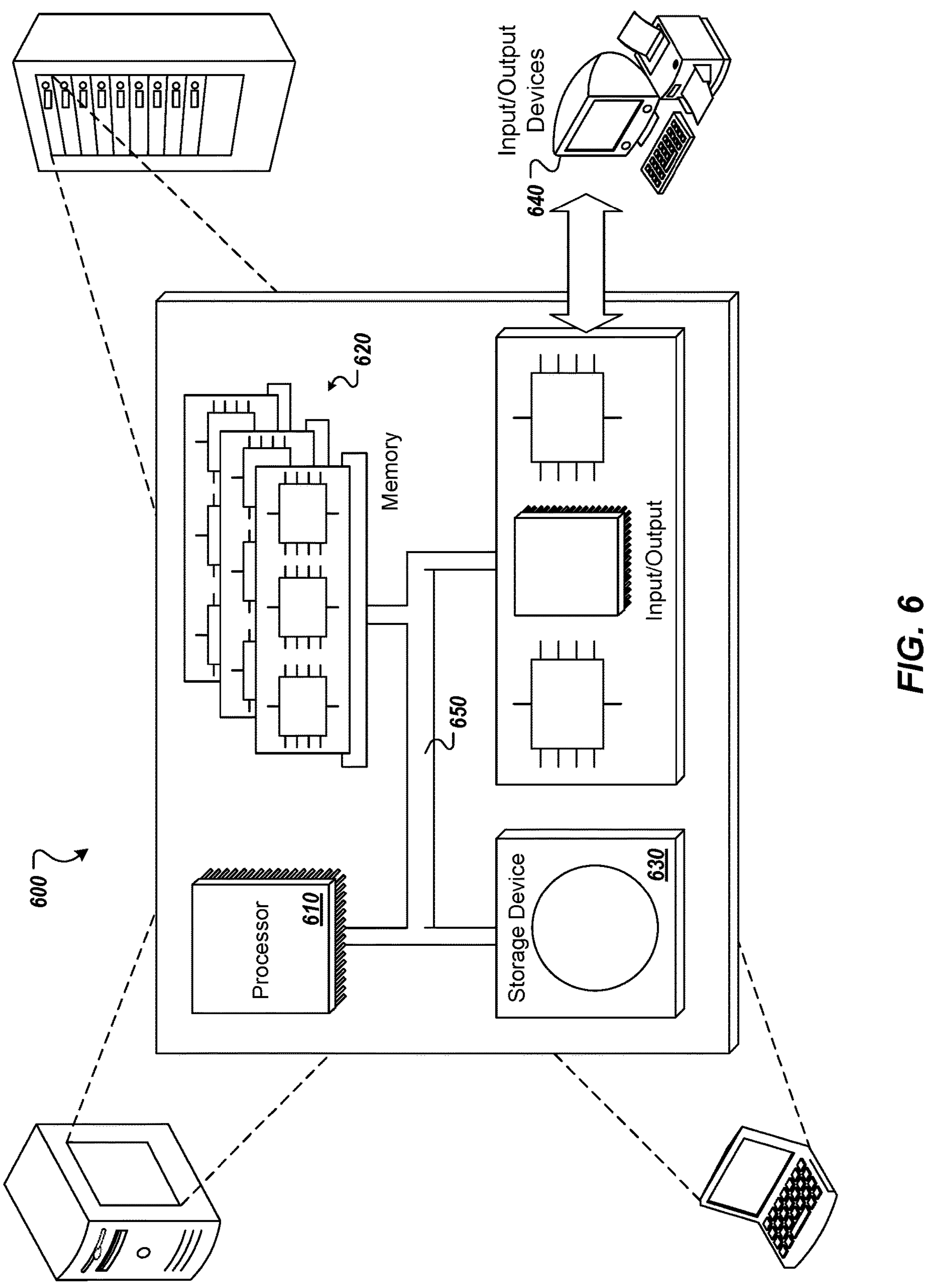
FIG. 6 is a schematic diagram of an example computer system that can be used to execute implementations of the present disclosure.

FIG. 6 is a schematic diagram of an example computer system 600 that can be used to execute implementations of the present disclosure. For example, the computer system 600 may be included in any or all of the server components discussed herein. The computer system 600 includes a processor 610, a memory 620, a storage device 630, and an input/output device 640. The components 610, 620, 630, and 640 are interconnected using a system bus 650. The processor 410 is capable of processing instructions for execution within the computer system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computer system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the computer system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Example 1: A computer-implemented method, comprising:

performing a cross-validation assessment of a plurality of predictive models, wherein the cross-validation assessment is based on time series data that is divided into an estimation data set and a validation data set, and wherein the estimation data set is used as training data;

based on the cross-validation assessment, determining, for each predictive model, a respective deviation risk, wherein the respective deviation risk is determined based on comparing forecasting variability distribution for the validation data set during the cross-validation assessment with forecasting variability distribution for test values from a test data set, wherein the test data set represents forecasted values generated based on a respective predictive model for a future horizon;

excluding one or more predictive models of the plurality of predictive models to define a set of candidate predictive models, wherein the excluding is based on evaluating deviation risks of each of the predictive models of the plurality of predictive models;

performing a model selection of a candidate model from the set of candidate predictive models, wherein the candidate model is selected based on evaluation of accuracy of the set of candidate predictive model according to the cross-validation assessment; and providing the candidate model for execution of a prediction for a requested time horizon.

Example 2: The computer-implemented method of Example 1, comprising:

obtaining the time series data, which comprises data observations associated with a date as a time dimension; and generating the plurality of predictive models for predicting a measure variable determined from the data observations.

Example 3: The computer-implemented method of any of the preceding Examples, wherein the plurality of predictive models comprises one or more of a double exponential smoothing model, an auto regression model, a linear regression model, and an exponential smoothing model.

Example 4: The computer-implemented method of any of the preceding Examples, comprising:

executing the candidate model to provide an output including predicted values for the requested time horizon.

Example 5: The computer-implemented method of Example 4, comprising: providing the output for use in automation of a service process execution.

Example 6: The computer-implemented method of any of the preceding Examples, wherein the comparing of the forecasting variability distribution is performed based on a deviation rejection rule for excluding predictive models that experience deviation in the forecasting variability distribution above a threshold.

Example 7: The computer-implemented method of any of the preceding Examples, wherein the cross-validation assessment is performed over a plurality of definitions of an estimation data set and a validation set based on respective different cut-off points to divide the time series data at different subsequent time points.

Example 8: The computer-implemented method of any of the preceding Examples, wherein determining a first deviation risk for a first predictive model from the plurality of predictive models comprises:

generating a first test data set for a future test time horizon, the first test data set being generated based on the first predictive model, wherein the first predictive model is trained based on a first set of estimation data sets of the time series data, and the first predictive model is validated based on a first set of validation data sets of the time series data, wherein each set of the first set of estimation data sets map to a respective set of the first set of validation data sets and to a cut-off point for the time series data.

Example 9. A system comprising:

one or more processors; and one or more computer-readable memories coupled to the one or more processors and having instructions stored thereon that are executable by the one or more processors to perform the method of any of Examples 1 to 8.

Example 10: A non-transitory, computer-readable medium coupled to one or more processors and having instructions stored thereon which, when executed by the one or more processors, cause the one or more processors to perform the method of any of Examples 1 to 8.

What is claimed is:

1. A computer-implemented method, comprising:

performing a cross-validation assessment of a plurality of predictive models, wherein the cross-validation assessment is based on time series data that is divided into an estimation data set and a validation data set, and wherein the estimation data set is used as training data;

based on the cross-validation assessment, determining, for each predictive model, a respective deviation risk, wherein the respective deviation risk is determined based on comparing forecasting variability distribution for the validation data set during the cross-validation assessment with forecasting variability distribution for test values from a test data set, wherein the test data set represents forecasted values generated based on a respective predictive model for a future horizon;

excluding one or more predictive models of the plurality of predictive models to define a set of candidate predictive models, wherein the excluding is based on evaluating deviation risks of each of the predictive models of the plurality of predictive models;

performing a model selection of a candidate model from the set of candidate predictive models, wherein the candidate model is selected based on evaluation of accuracy of the set of candidate predictive model according to the cross-validation assessment; and providing the candidate model for execution of a prediction for a requested time horizon.

2. The computer-implemented method of claim 1, comprising:

obtaining the time series data, which comprises data observations associated with a date as a time dimension; and generating the plurality of predictive models for predicting a measure variable determined from the data observations.

3. The computer-implemented method of claim 1, wherein the plurality of predictive models comprises one or more of a double exponential smoothing model, an auto regression model, a linear regression model, and an exponential smoothing model.

4. The computer-implemented method of claim 1, comprising:

executing the candidate model to provide an output including predicted values for the requested time horizon.

5. The computer-implemented method of claim 4, comprising:

providing the output for use in automation of a service process execution.

6. The computer-implemented method of claim 1, wherein the comparing of the forecasting variability distribution is performed based on a deviation rejection rule for excluding predictive models that experience deviation in the forecasting variability distribution above a threshold.

7. The computer-implemented method of claim 1, wherein the cross-validation assessment is performed over a plurality of definitions of an estimation data set and a validation set based on respective different cut-off points to divide the time series data at different subsequent time points.

8. The computer-implemented method of claim 1, wherein determining a first deviation risk for a first predictive model from the plurality of predictive models comprises:

generating a first test data set for a future test time horizon, the first test data set being generated based on the first predictive model, wherein the first predictive model is trained based on a first set of estimation data sets of the time series data, and the first predictive model is validated based on a first set of validation data sets of the time series data, wherein each set of the first set of estimation data sets map to a respective set of the first set of validation data sets and to a cut-off point for the time series data.

9. A non-transitory, computer-readable medium coupled to one or more processors and having instructions stored thereon which, when executed by the one or more processors, cause the one or more processors to perform operations comprising:

performing a cross-validation assessment of a plurality of predictive models, wherein the cross-validation assessment is based on time series data that is divided into an estimation data set and a validation data set, and wherein the estimation data set is used as training data;

based on the cross-validation assessment, determining, for each predictive model, a respective deviation risk, wherein the respective deviation risk is determined based on comparing forecasting variability distribution for the validation data set during the cross-validation assessment with forecasting variability distribution for test values from a test data set, wherein the test data set represents forecasted values generated based on a respective predictive model for a future horizon;

excluding one or more predictive models of the plurality of predictive models to define a set of candidate predictive models, wherein the excluding is based on evaluating deviation risks of each of the predictive models of the plurality of predictive models;

performing a model selection of a candidate model from the set of candidate predictive models, wherein the candidate model is selected based on evaluation of accuracy of the set of candidate predictive model according to the cross-validation assessment; and providing the candidate model for execution of a prediction for a requested time horizon.

10. The non-transitory computer-readable medium of claim 9, wherein the non-transitory computer-readable medium stores instructions which when executed by the one or more processors, cause the one or more processors to perform operations comprising:

obtaining the time series data, which comprises data observations associated with a date as a time dimension; and generating the plurality of predictive models for predicting a measure variable determined from the data observations.

11. The non-transitory computer-readable medium of claim 9, wherein the plurality of predictive models comprises one or more of a double exponential smoothing model, an auto regression model, a linear regression model, and an exponential smoothing model.

12. The computer-implemented method of claim 9, wherein the non-transitory computer-readable medium stores instructions which when executed by the one or more processors, cause the one or more processors to perform operations comprising:

executing the candidate model to provide an output including predicted values for the requested time horizon.

13. The non-transitory computer-readable medium of claim 12, wherein the non-transitory computer-readable medium stores instructions which when executed by the one or more processors, cause the one or more processors to perform operations comprising:

providing the output for use in automation of a service process execution.

14. The non-transitory computer-readable medium of claim 9, wherein the comparing of the forecasting variability distribution is performed based on a deviation rejection rule for excluding predictive models that experience deviation in the forecasting variability distribution above a threshold.

15. A computer-implemented system comprising:

one or more processors; and one or more computer-readable memories coupled to the one or more processors and having instructions stored thereon that are executable by the one or more processors to perform operations comprising:

performing a cross-validation assessment of a plurality of predictive models, wherein the cross-validation assessment is based on time series data that is divided into an estimation data set and a validation data set, and wherein the estimation data set is used as training data;

based on the cross-validation assessment, determining, for each predictive model, a respective deviation risk, wherein the respective deviation risk is determined based on comparing forecasting variability distribution for the validation data set during the cross-validation assessment with forecasting variability distribution for test values from a test data set, wherein the test data set represents forecasted values generated based on a respective predictive model for a future horizon;

excluding one or more predictive models of the plurality of predictive models to define a set of candidate predictive models, wherein the excluding is based on evaluating deviation risks of each of the predictive models of the plurality of predictive models;

performing a model selection of a candidate model from the set of candidate predictive models, wherein the candidate model is selected based on evaluation of accuracy of the set of candidate predictive model according to the cross-validation assessment; and providing the candidate model for execution of a prediction for a requested time horizon.

16. The system of claim 15, wherein the one or more computer-readable memories stores instructions which when executed by the one or more processors, cause the one or more processors to perform operations comprising:

obtaining the time series data, which comprises data observations associated with a date as a time dimension; and generating the plurality of predictive models for predicting a measure variable determined from the data observations.

17. The system of claim 15, wherein the plurality of predictive models comprises one or more of a double exponential smoothing model, an auto regression model, a linear regression model, and an exponential smoothing model.

18. The system of claim 15, wherein the one or more computer-readable memories stores instructions which when executed by the one or more processors, cause the one or more processors to perform operations comprising:

executing the candidate model to provide an output including predicted values for the requested time horizon.

19. The system of claim 18, wherein the one or more computer-readable memories stores instructions which when executed by the one or more processors, cause the one or more processors to perform operations comprising:

providing the output for use in automation of a service process execution.

20. The system of claim 15, wherein the comparing of the forecasting variability distribution is performed based on a deviation rejection rule for excluding predictive models that experience deviation in the forecasting variability distribution above a threshold.

* * * * *